Aug. 2, 1960 G. L. SCHNABLE 2,947,079
METHOD OF SOLDER BONDING
Filed Nov. 3, 1955
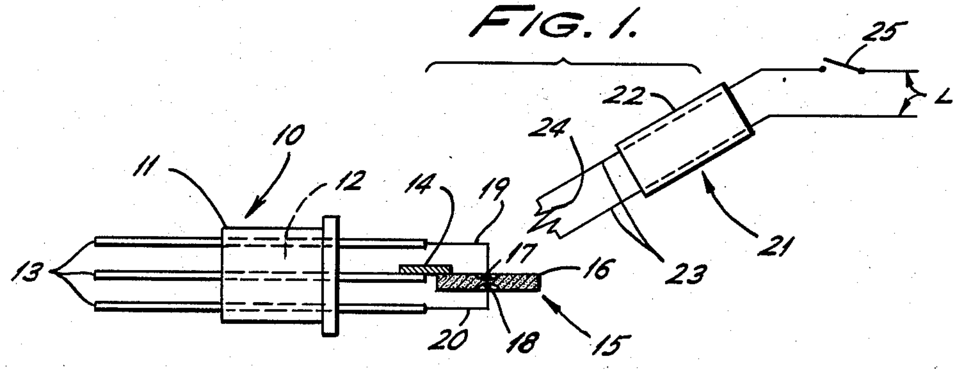
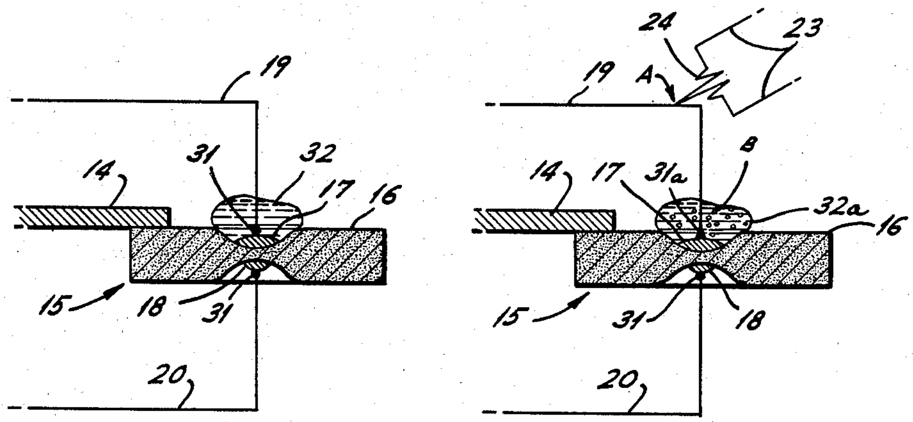
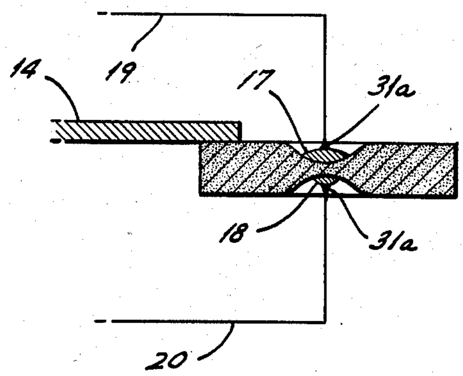
FIG. 4.
INVENTOR.
GEORGE L. SCHNABLE
BY
Carl H. Synnestvedt
AGENT United States Patent Office 2,947,079

Patented Aug. 2, 1960

2,947,079

METHOD OF SOLDER BONDING

George L. Schnable, Lansdale, Pa., assignor to Philco Corporation, Philadelphia, Pa., a corporation of Pennsylvania Filed Nov. 3, 1955, Ser. No. 544,665

3 Claims. (Cl. 29—495)

This invention relates to a method of bonding or joining articles, and more particularly to a novel method of solder-bonding metal members. While of broader utility, the method of my invention is especially adapted to the making of electrical connections in the manufacture of semiconductor devices. The point of connection of a "whisker" wire, with the indium electrode of a semiconductor device, is an example of a junction especially adapted for solder-bonding by this method.

It is a principal object of this invention to provide a novel and effective soldering method useful in the manufacture of electrical and electronic assemblies.

It is another object of this invention to provide a novel method for soldering, involving the use of low melting point solders in combination with correspondingly low boiling point fluxing fluids.

It is a further object of this invention to provide a simple process for limiting the temperature at which a soldering operation is carried out.

In achievement of the foregoing objectives this invention provides a method wherein members to be joined are placed in juxtaposition, with a heat fusible bonding material in the region of a considerable quantity of applied flux, a source of heat then being brought into contact with one of said members, in close proximity to the aforementioned region, to raise the temperature of the member and to melt the juxtaposed bonding material. Importantly, the temperature at which the melting occurs is lower than the boiling temperature of the flux and is not in excess of the melting temperature of the members being joined. In this way it is possible to limit the temperature of the members being joined to a value substantially equal to the boiling point of the flux.

As hereinafter shown and described, and by way of example alone, the members to be joined comprise a lead wire, with solder attached, and a germanium wafer with its electrode attached, in which instance the lead wire is to be attached, or soldered, to the electrode.

A solder alloy suitable to the method of solder-bonding with which this invention is concerned is disclosed and claimed in U.S. Patent No. 2,897,587 issued to George L. Schnable, based on application Serial No. 510,536, filed May 23, 1955, and assigned to the assignee of the present invention. As stated therein the members to be joined are brought together with an indium-cadmium alloy, in molten form, in bonding relation therebetween. This alloy, which is well adapted for use in the practice of my invention, may comprise 25% cadmium and 75% indium, by weight, this combination forming a eutectic mixture having a melting point of 122.5° C. Although it is preferred that a cadmium-indium alloy of the above proportions be used, it is to be understood that an alloy containing as little as 40% and as much as 80% indium, the remaining portions being cadmium, is satisfactory. The composition of the alloy is of course dependent upon the melting characteristics desired.

In further accordance with the novel method of this invention, a suitable flux is placed in solution with a solvent having a boiling temperature above the melting point of the solder (122.5° C.) and below the melting points of the lead (whisker wire) and the indium electrode. The melting point of the indium is 155° C., and this is the upper temperature limit not to be exceeded in the particular soldering operation to be described by way of example. A fluxing solution as described, and found satisfactory to performance of this soldering operation, comprises 5 to 20 percent zinc chloride, by weight, in ethylene glycol monomethyl ether. The ethylene glycol monomethyl ether itself is known to boil at 124.5° C., and solutions of it containing zinc chloride in varying concentrations up to and including 20% have been found to have higher boiling points than 124.5° C., in increments varying with the aforesaid degrees of concentration. A 20% solution of zinc chloride in ethylene glycol monomethyl ether, although having a boiling point above 124.5° C., boils well below the 155° C. temperature not to be exceeded in performing the described soldering operation.

It is further to be recognized that, in the broader aspect of this invention, other solders and fluxes may be used, although, as emphasized, it is important to note that the fluxing fluid should have a boiling temperature equal to or in excess of the solder's melting point and not exceeding the fusion temperature of the materials being joined. For example other fluxes found to be satisfactory for use in performance of the method of my invention may include cadmium chloride or indium trichloride in solution with a suitable liquid, or solvent.

In the accompanying drawings forming a part of this specification and in which like numerals are employed to designate like parts:

Figure 1 is a somewhat diagrammatic view of a simple form of apparatus for carrying out the method, and includes an elevational showing of one type of device which can be soldered by following the method of the present invention;

Figure 2 is an enlarged fragmentary view of the device to be soldered showing the physical relationship of elements prior to soldering;

Figure 3 is a view similar to Figure 2, and showing the relation of elements during soldering of a single lead to its electrode; and Figure 4 is a view similar to Figure 3 and taken after both solder joints have been made and excess flux removed.

Referring more particularly to the drawing, there is shown in Figure 1 a well known type of semiconductor unit 10, the unit being shown without the hermetically sealed enclosure which normally houses the same. Included in the unit 10 is a shell 11 which encloses a stem member or element 12 of non-porous, non-conductive material. Extending through element 12, and mounted therein, are three pins 13, and that one disposed intermediate of the remaining two supports a nickel electrode 14. Supported, in turn, by the electrode 14 is the semiconductor, in this case transistor, element 15, which includes a germanium wafer 16 having indium electrodes 17 and 18 attached thereto. Two of the pins 13 support whisker wire leads 19 and 20, each of said leads having an end portion in abutting relation to said indium electrodes 17 and 18.

Simple apparatus for carrying out the novel method of soldering may include the electric heating means shown at 21, which is of known design, and comprises an insulating handle 22 with electrodes 23 mounted thereon. Carried by the electrodes 23, and in electrical contact therewith, is a resistive-type heater wire 24 of known material, such as, for example, a nickel-chromium alloy known as Nichrome. Necessary voltage to energize heater wire 24 is supplied through electrodes 23 from the line L, and switch 25 placed in series with the heater provides a means for energizing or deenergizing the latter.

In Figure 2 the solder 31, attached to and forming a part of each of the whisker wires 19 and 20, is shown abutting the indium electrodes 17 and 18 prior to initiation of the soldering operation. Also shown is a droplet 32 of fluxing solution so disposed as to immerse the solder-electrode junction. Solder attachment of whisker wire 19 to the indium electrode 17 is shown in Figure 3, wherein the solder tip, now designated **31*a*, is seen to have melted within the body of flux 32*a*** and thereby formed the desired bond between the wires and the electrodes.

In Figure 4 there is shown the completed junctions of wires 19 and 20, with their respective electrodes 17 and 18, through the agency of solder **31*a***.

In particular accordance with the invention, fluxing solution is applied to the transistor element 15 (Figure 2) to form a droplet (32—**32*a***) which not only encloses, or immerses, the junction to be soldered, but also is in amount sufficient to insure that all of the flux will not be boiled away before completion of the soldering operation. As will now be understood, the temperature limiting action of the flux requires, of course, that an appreciable amount of flux be present. Application of the fluxing solution has been carried out by dipping a glass, or polyethylene, rod into the flux, followed by removal of the rod and transfer of the droplet formed thereon to the transistor element, as by touching the droplet to the element.

Energized heater 24 (Figure 3) is then brought into contact with wire 19 in the region of the junction to be soldered, as at A, and certain of the heat generated flows by conduction through the wire and into solder 31, electrode 17, and flux 32. Additional energy available at the heater takes the form of radiant heat and may be directed at the junction point. It will be appreciated that at least some of the radiant energy passes through the relatively transparent flux. Heat continues to be supplied to the system, including the elements being joined, to cause its temperature to rise to a value sufficient to melt the solder, but not sufficient to melt the elements being joined, the solder after melting being represented at **31*a***.

Heat conducted through the lead 19 flows not only into the solder, but into the flux solution as well. Consequently the temperatures of the solder and the solution rise until that temperature at which the solder melts (122.5° C.) is reached. A subsequent temperature rise occurs following complete melting of the solder until such time that the boiling temperature of the flux solution is reached, whereupon an additional rise in temperature of the system is prevented through the limiting characteristic of the substantially constant-temperature boiling, or vaporizing, action of the solution, said boiling being indicated by formation of bubbles, as at B. In short, the heat in excess of that required to melt the solder is dissipated as the latent heat of vaporization of the flux solution, and the temperature is not permitted to rise to a value sufficiently high to damage either the indium electrode or the lead attached thereto. This vaporization continues throughout the remainder of the soldering operation, because, as has already been pointed out, a sufficient amount of flux solution has been utilized in order that complete boiling away of the same does not occur prior to termination of the operation.

It will, of course, be understood that heat should not be supplied in such manner or quantity as to cause substantially instantaneous volatilization of the body or droplet of liquid fluxing material 32, since such instantaneous evaporation would necessarily result in damage to the members being joined. It will be recognized however, that provided the supplied heat does not exceed that amount which will result in what might be termed a steady boil, the temperature of the members being joined cannot possibly rise appreciably above the vaporization temperature of the liquid fluxing material which surrounds the juncture, and is present in such quantity as to maintain the juncture immersed throughout the soldering operation.

The operations as described are repeated in the joining of wire 20 to electrode 18 and will not be described, inasmuch as the methods are identical for solder-bonding each of the junctions shown.

Upon completion of the soldering operation described, the device 10 may, if desired, be subjected to other manufacturing procedures, such as excess-flux removal by rinsing, or the application of suitable clean-up solutions.

From the foregoing description it will be appreciated that among the more important advantages of the novel method of this invention is the provision of an accurately controlled method of soldering, or bonding, which enables maintaining the temperatures of articles being joined within limits not causing deterioration of said articles. Any heat supplied to the articles, or system, being joined, in excess of that required to effect the bond, is dissipated in the form of latent heat of vaporization of the flux solvent. It is to be understood that a desired operational temperature level can be maintained through selection of various solders and fluxes having known physical properties suitable to the method of this invention.

I claim:

1. In solder bonding a whisker wire to an electrode disposed upon a body of semiconductive material, said wire having a melting temperature above that of the electrode, the method comprising: disposing said wire adjacent said electrode with a body of solder contacting each thereof, said solder having a melting temperature below the melting temperature of said electrode; immersing the juncture of said solder, wire, and electrode in a fluxing solution having a vaporization temperature intermediate the melting temperature of the solder and electrode; applying heat to said wire to melt the solder and to vaporize a portion of the fluxing solution; and halting the application of heat prior to complete vaporization of the fluxing solution and while said juncture remains immersed in said solution.

2. In solder bonding a lead wire to an electrode disposed upon a body of semiconductive material, said wire having a melting temperature above that of the electrode, the method comprising: disposing said wire adjacent said electrode with a body of solder contacting each thereof, said solder having a melting temperature below the melting temperature of said electrode; immersing the juncture of said solder, wire, and electrode in a fluxing solution having a vaporization temperature intermediate the melting temperature of the solder and electrode; and heating said wire to melt the solder and to vaporize a portion of the fluxing solution, said heating of the wire being effected only while maintaining the juncture immersed in said fluxing solution.

3. In solder bonding a lead wire to an indium electrode disposed upon a body of germanium, said wire having a melting temperature above that of the indium electrode, the method comprising: disposing said wire adjacent said indium electrode with a body of solder contacting each thereof, said solder having a melting temperature below the melting temperature of said indium electrode; immersing the juncture of said solder, wire, and indium electrode in a fluxing solution having a vaporization temperature intermediate the melting temperatures of the solder and the indium electrode; applying heat to said wire to melt the solder and to vaporize a portion of the fluxing solution; and halting the application of heat to the wire prior to complete vaporization of the fluxing solution and while said juncture remains immersed in said solution.

References Cited in the file of this patent

UNITED STATES PATENTS

| | | |
|---|---|---|
| 1,443,082 | Mauck | Jan. 23, 1923 |
| 1,969,840 | Goddard | Aug. 14, 1934 |
| 2,003,019 | Strobel | May 28, 1935 |
| 2,157,918 | Rankin | May 9, 1939 |
| 2,262,901 | Murphy | Nov. 18, 1941 |
| 2,291,399 | Miller | July 28, 1942 |
| 2,296,435 | Giard | Sept. 22, 1942 |
| 2,450,120 | Cate | Sept. 28, 1948 |
| 2,512,426 | Hartly | June 20, 1950 |
| 2,575,976 | Rock | Nov. 20, 1951 |
| 2,612,459 | Willard et al. | Sept. 30, 1952 |
| 2,612,460 | Willard et al. | Sept. 30, 1952 |
| 2,640,793 | Doerr | June 2, 1953 |
| 2,672,681 | Klain | Mar. 23, 1954 |
| 2,705,767 | Hall | Apr. 5, 1955 |
| 2,735,919 | Shower | Feb. 21, 1956 |
| 2,756,497 | Gale | July 31, 1956 |
| 2,807,558 | Pankove | Sept. 24, 1957 |
| 2,842,841 | Schnable et al. | July 15, 1958 |
| 2,862,294 | Philip | Dec. 2, 1958 |